No. 810,446. PATENTED JAN. 23, 1906.
R. A. B. WALSH.
WIRED GLASS MAKING MACHINE.
APPLICATION FILED JULY 22, 1905.

Witnesses
A. J. McCauley
B. F. Funk

Inventor
Robert A. B. Walsh
BY Bakewell Cornwall ATTY'S.

UNITED STATES PATENT OFFICE.

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

WIRED-GLASS-MAKING MACHINE.

No. 810,446.   Specification of Letters Patent.   Patented Jan. 23, 1906.

Application filed July 22, 1905. Serial No. 270,776.

*To all whom it may concern:*

Be it known that I, ROBERT A. B. WALSH, a citizen of the United States, residing at St. Louis, Missouri, have invented a certain new and useful Improvement in Wired-Glass-Making Machines, of which the following is a full, clear, and exact description, such as will enable others skilled in the art to which it appertains to make and use the same, reference being had to the accompanying drawings, forming part of this specification, in which—

Figure 1:
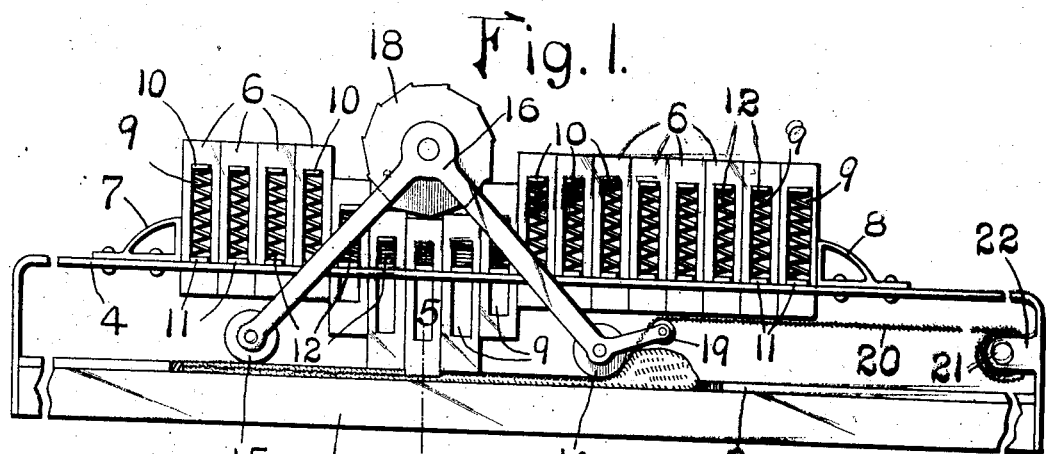
Figure 5:
Figure 2:
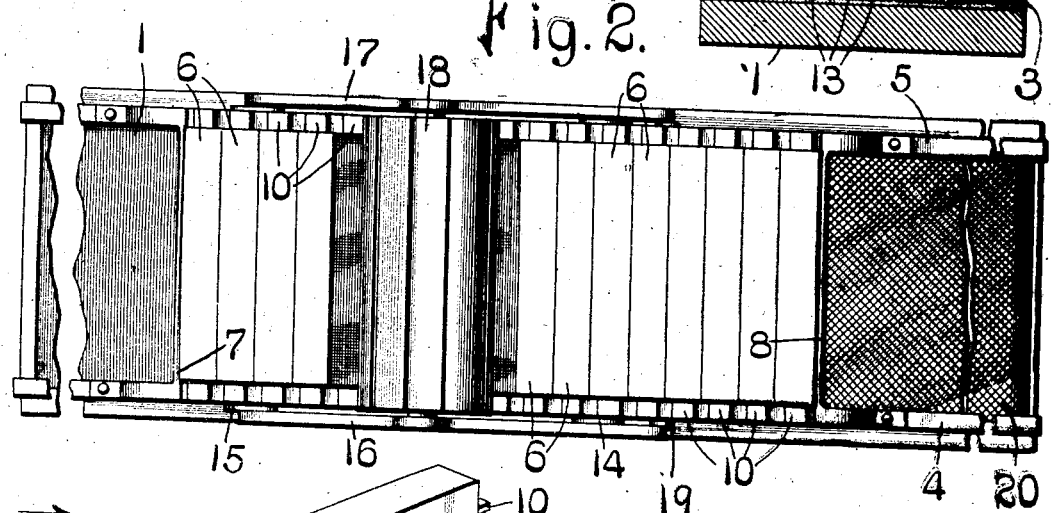
Figure 3:
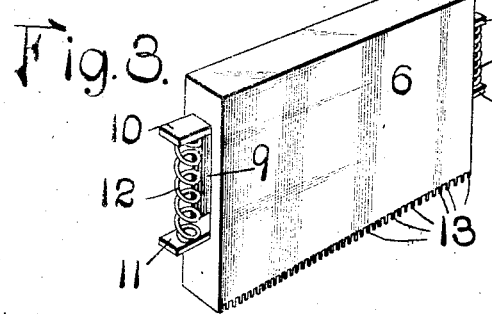
Figure 4:
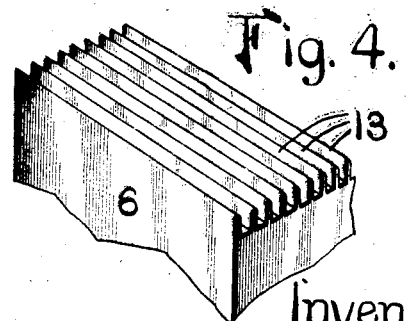

Figure 1 is a side elevational view of a glass-wiring machine used in practicing my invention. Fig. 2 is a top plan view of the same. Fig. 3 is a detail perspective view of one of the wire-embedding elements. Fig. 4 is a fragmentary inverted view of one of the wire-embedding elements, and Fig. 5 is a transverse sectional view on the line 5 5 of Fig. 1.

This invention relates to machines for making wired glass; and one of the objects is to provide means for embedding wire in a plate or sheet of glass as it is being formed on a table or bed.

Another object is to provide means for uniformly centering the wire in the glass plate or sheet; and a still further object is to provide a wired sheet or plate of glass of uniform thickness.

Other objects and advantages, as well as the details of construction of my invention, will be referred to hereinafter, it being understood that minor changes in the construction, arrangement, and combination of the several parts can be made without departing from the nature or principle of my invention.

In the drawings illustrating the preferred form of my invention, 1 indicates a base or table on the upper longitudinal edges of which are trangs 2 and 3, the thickness of the trangs determining the thickness of the plate or sheet of glass. Skeleton frames 4 and 5 are connected to the base and consist of vertical standards connected by horizontal longitudinally-arranged supporting-bars, on which are the resiliently-supported wire-positioning devices, comprising vertically-movable blocks 6, arranged side by side and confined between the end brackets 7 and 8. The blocks 6 are provided with vertical elongated slots 9, in which are spaced strips 10 and 11, having projecting ends, between which are coiled springs 12. The projecting ends of the strips 11 rest on top of the supporting-bars of the frames 4 and 5, while the strips 10 rest against the upper edges of the slots 9, so that the expansive forces exerted by the springs 12 will have a tendency to maintain the blocks 6 in elevated positions, or in the positions indicated in Fig. 1, on either side of the depressing-roller. The blocks 6 are provided with pluralities of teeth or ribs 13, which are preferably arranged longitudinally of the bed 1, and these teeth or ribs are provided for the purpose of impressing the wire into the glass plate or sheet, so as to center it or force the wire beneath the surface of the sheet or plate of glass.

14 and 15 designate pilot or spreader and cover rollers, respectively. The pilot or spreader roller 14 is designed to pass over the batch of glass as it is placed upon the table or bed 1, so as to initially form the sheet. These rollers are connected by approximately inverted-V-shaped frames 16 and 17, said frames receiving the journals of a shouldered roller 18, which are journaled in said frames at their upper angle portions. The front arms of the frames 16 and 17 have projections which are provided with bearings for an idler-roller 19 to receive the wire mesh 20 from the wheel 21 in the brackets 22 of the respective skeleton frames 4 and 5. This wire mesh 20 passes over the idler 19 beneath the roller 14. As the roller 14 advances over the glass to spread it upon the table the wire is slightly impressed upon the glass, and the roller 18 successively engages the positioning devices 6, so as to depress them and cause the teeth or ribs 13 to sink the wire beneath the surface of the glass. During the positioning action of the devices 6 the upper surface of the glass sheet or plate will be slightly disturbed, so as to have a tendency to make the upper surface of the glass uneven, particularly if the glass should happen to cool rather quickly. To prevent this, I have arranged the roller 15 to follow the actions of the positioning devices and smooth out the upper surface, so as to eliminate inequalities in the upper surface of the finished plate. After the glass has been formed with the wire properly positioned between the upper and lower surfaces the mesh will be severed, so that the glass may be annealed in the usual manner.

From the foregoing it will be apparent that the several operations are carried out in their proper order of sequence, so that the best results will be obtainable. The glass is first placed upon the table or bed, then rolled out or partially rolled out, during which rolling the wire is impressed in the upper surface of the sheet, then it is further pressed to properly position it, and finally the sheet is smoothed out by a roller passing over the top of the plate.

I have illustrated the device as being capable of making plain wired glass; but it is obvious that configured or prismatic wired glass may also be made by configuring the bed over which the glass is made.

Having thus described the invention, what is claimed as new, and desired to be secured by Letters Patent, is—

1. In a machine for making wired glass, the combination with a base, of vertically-reciprocatory wire-positioning elements above the base, a roller movable over the wire-positioning elements and having offsetted portions for depressing them to position the wire; substantially as described.

2. In a machine for making wired glass, the combination with a base, of vertically-reciprocatory wire-positioning elements above the base, a roller movable over the wire-positioning elements and having offsetted portions for depressing them to position the wire, and means for rolling a sheet of glass; substantially as described.

3. In a machine for making wired glass, the combination with a base, of means for spreading the glass on the base, means for feeding wire on top of the glass, vertically-reciprocatory wire-impressing elements 6 above the base, and a roller movable over said wire-impressing elements for actuating them; substantially as described.

4. In a machine for making wired glass, the combination with a base, means for spreading the glass on the base, means for feeding wire on top of the glass, wire-impressing elements 6 resiliently supported above the base, and a roller 18 having projections for engaging the top edges of the elements 6 to actuate them; substantially as described.

In testimony whereof I hereunto affix my signature, in the presence of two witnesses, this 12th day of July, 1905.

ROBERT A. B. WALSH.

Witnesses:
B. F. FUNK,
GEORGE BAKEWELL.